F. HOLDEN.
Horse Rake.
No. 49,269.
Patented Aug. 8, 1865.
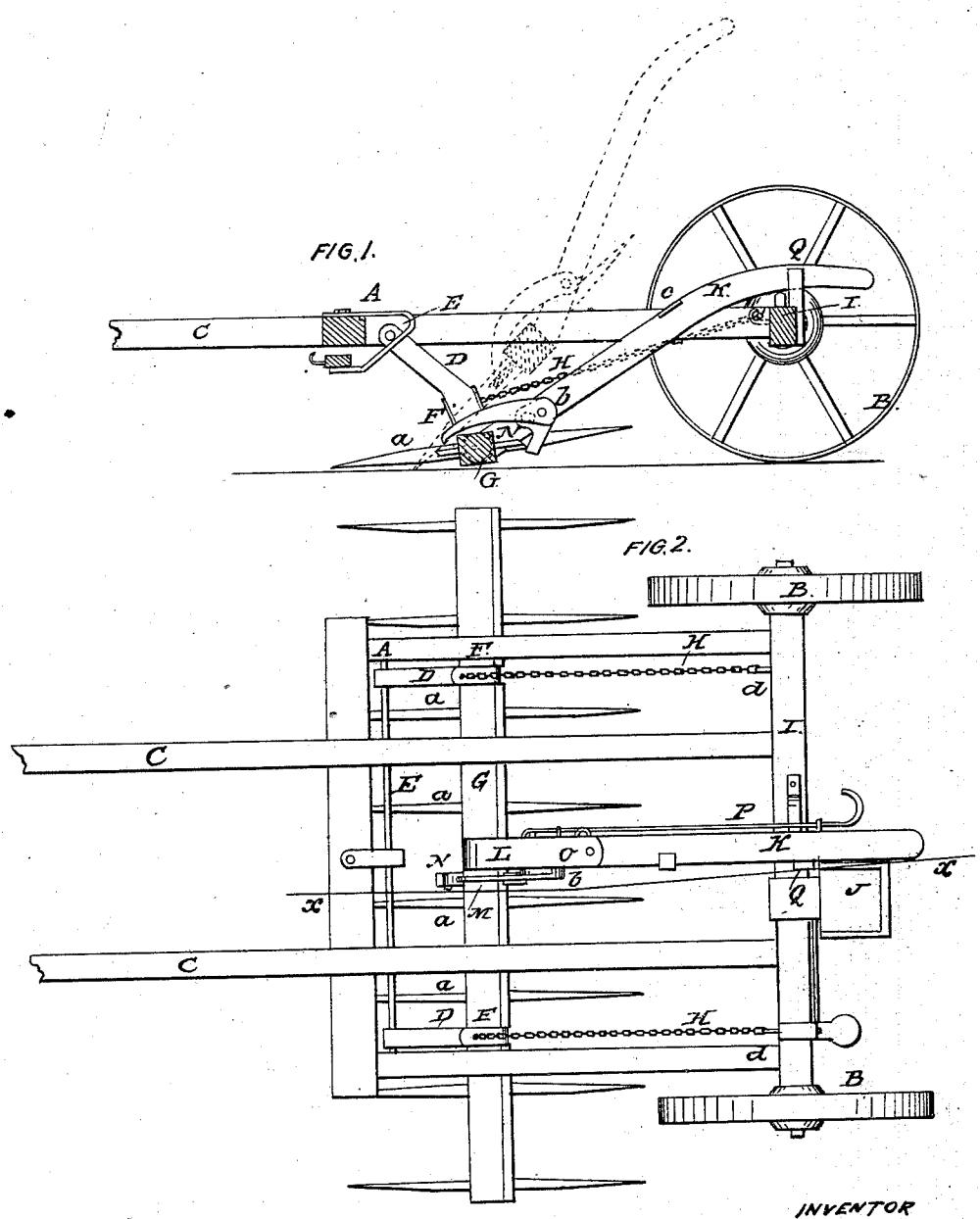

UNITED STATES PATENT OFFICE.

FRANKLIN HOLDEN, OF CLYDE, ILLINOIS.

IMPROVEMENT IN HORSE-RAKES.

Specification forming part of Letters Patent No. 49,269, dated August 8, 1865.

*To all whom it may concern:*

Be it known that I, FRANKLIN HOLDEN, of Clyde, in the county of Macoupin and State of Illinois, have invented a new and Improved Horse-Rake; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x$ $x$, Fig. 2; Fig. 2, a plan or top view of the same.

Similar letters of reference indicate like parts.

This invention relates to a new and improved horse-rake of that class which is provided with a revolving straight-toothed rake; and it consists in a novel construction and arrangement of parts, as hereinafter fully shown and described, whereby the device may be manipulated with the greatest facility and the rake adjusted to operate at a greater or less distance above the surface of the ground, as the nature of the work to be performed may require.

A represents a rectangular frame, the rear part of which is supported by the wheels B B.

C C are the thills, and D D two swinging rods or pendants, the upper ends of which are fitted loosely on a shaft, E, in the front part of the frame A. The lower ends of these rods D D are connected by metal straps F F with a rake-head, G, which is allowed to turn freely in the straps, said rake-head having straight wooden teeth $a$ passing through it, which project at equal distances from two opposite sides of the head. Each rod D is connected by a chain, H, with the axle I of the wheels B B.

J is the driver's seat, placed on the axle I, and K is a bar or handle, the lower end of which is connected by a metal strap, L, with the rake-head G at about its center. The handle K has a pawl, M, attached to its lower part, and the rake-head G has a metal bar, N, passing through it in line with the pawl M.

O is a pawl which is fitted on the same rod $b$ as the pawl M, and said pawl O is connected to a rod, P, which is at the right-hand side of the handle K.

As the machine is drawn along, the driver, from his seat J, throws forward the handle K, and the pawl M catches in a notch, $c$, at the front end of the bar N, and keeps the front ends of the rake-teeth $a$ to their work, so that they will gather up the hay, stubble, or other article being raked up, and when the rake is full the driver throws the handle K still farther forward, so that the front ends of the rake-teeth will catch into the earth, and the rake will, under the forward or draft movement of the device, make a half-revolution and discharge its load, and the ends of the teeth which were previously at the front of the rake are now at the rear and those which were at the rear now at the front. The same may be said of the ends of bar N. At any time when it is necessary to raise the front ends of the rake-teeth in order to pass over obstructions the driver draws backward rod P, which actuates the pawl O and causes the latter to bear down on the rear of bar N.

In order to raise the rake above the surface of the ground, as is necessary in order to draw the machine from place to place, pass over large obstructions, &c., the driver draws backward and upward and then presses downward the rear of the handle K, thereby raising the rake, which is retained in an elevated position in consequence of a plate, $c$, on the handle fitting under a catch, Q, on the axle.

The chains H H perform an important function. They cause the rake to be drawn back with the machine when it is backed and admit of the rake being adjusted higher or lower to work at a greater or less elevation above the surface of the ground by taking up more or less links on the hooks $d$ at the front side of the axle.

Having thus described my invention, I claim as new, and desire to secure by Letters Patent—

1. The suspending of the rake-head G to the frame A of the machine by means of swinging rods D D, connected by chains H to the axle A, substantially as and for the purpose set forth.

2. The pawl O, connected with the rod P, in connection with the bar N in the rake-head, and handle K, all arranged substantially as and for the purpose specified.

3. The combination of the handle K, pawls M O, bar N, and suspended rake, all arranged with a mounted frame to operate substantially as and for the purpose set forth.

FRANKLIN HOLDEN.

Witnesses:
THOS. I. WILLIAMS,
JOHN C. LEA.